Dec. 31, 1957 R. N. CARSON, JR 2,818,104
SPRINGS AND SPRING ASSEMBLIES
Filed Nov. 19, 1951 4 Sheets-Sheet 1
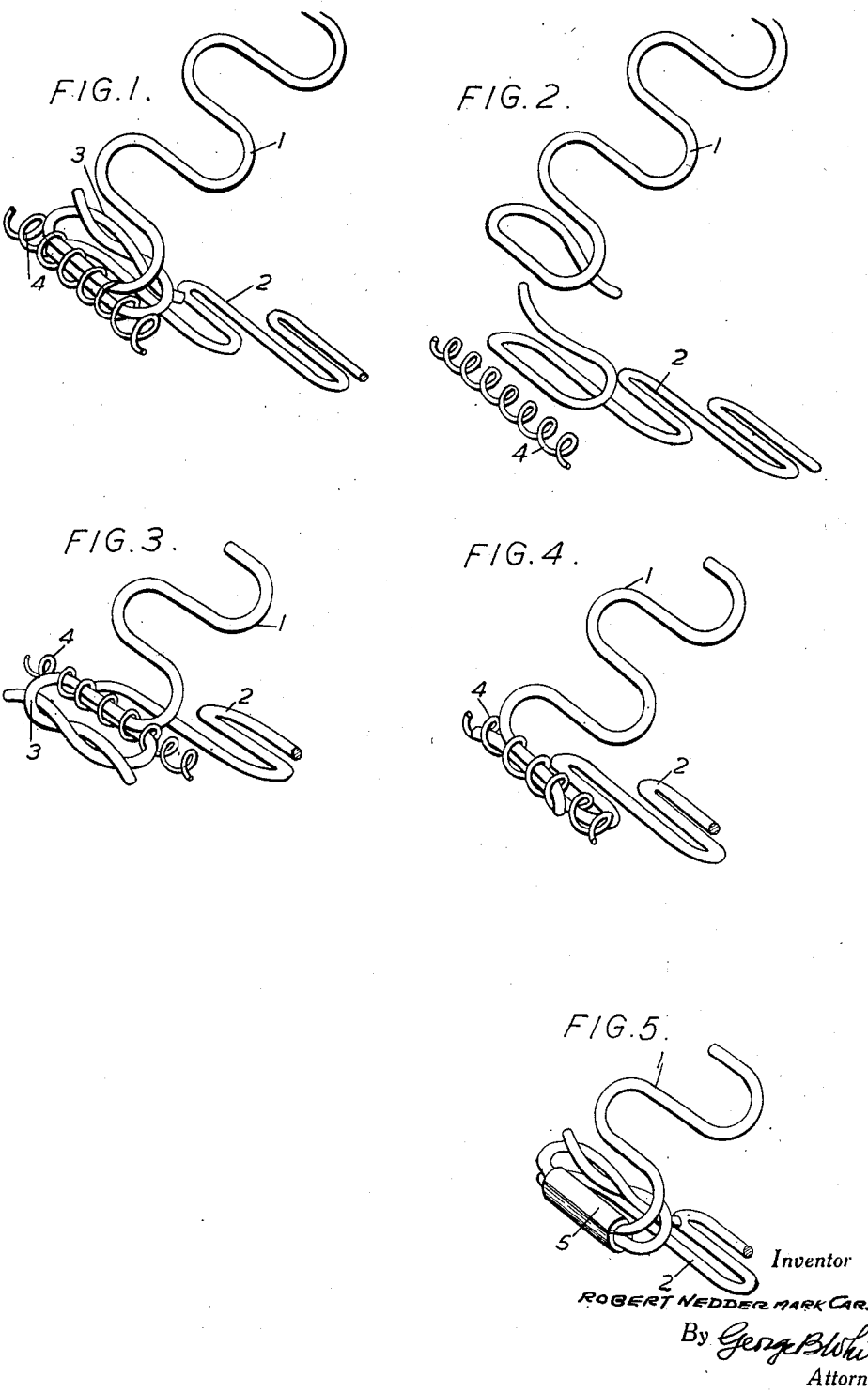
Inventor
ROBERT NEDDERMARK CARSON
By George B White
Attorney Dec. 31, 1957  R. N. CARSON, JR  2,818,104
SPRINGS AND SPRING ASSEMBLIES
Filed Nov. 19, 1951  4 Sheets-Sheet 2
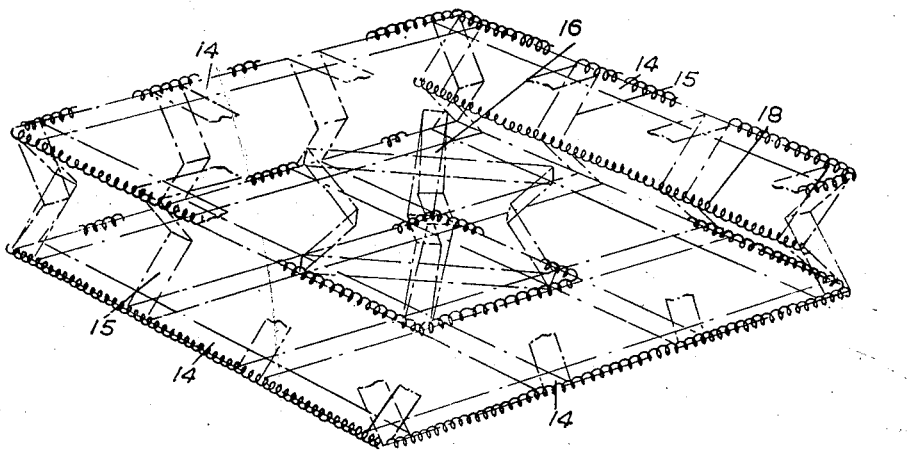
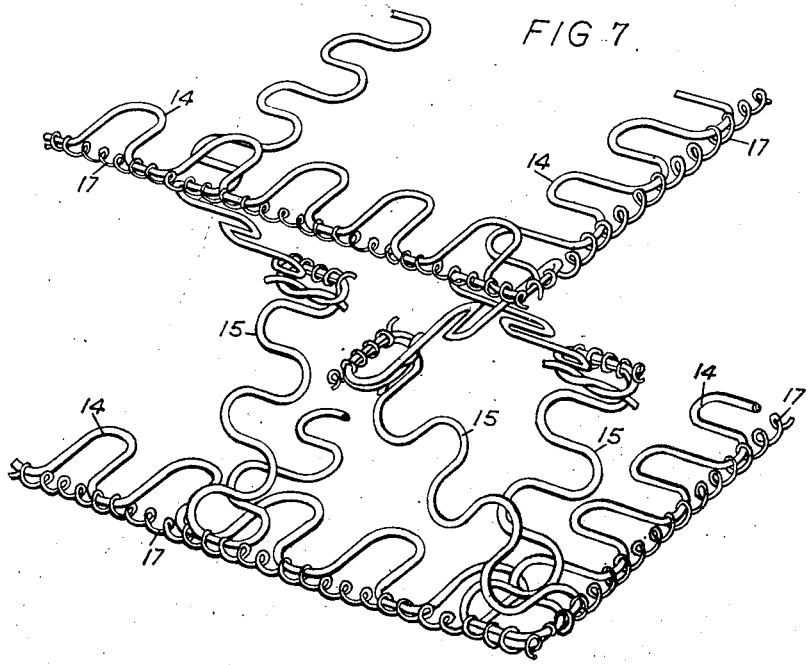
Inventor
ROBERT NEDDERMARK CARSON
By George B. White
Attorney Dec. 31, 1957  R. N. CARSON, JR  2,818,104
SPRINGS AND SPRING ASSEMBLIES
Filed Nov. 19, 1951  4 Sheets-Sheet 3

Inventor
ROBERT NEDDERMARK CARSON
By George B White
Attorney

Dec. 31, 1957 R. N. CARSON, JR 2,818,104
SPRINGS AND SPRING ASSEMBLIES
Filed Nov. 19, 1951 4 Sheets-Sheet 4
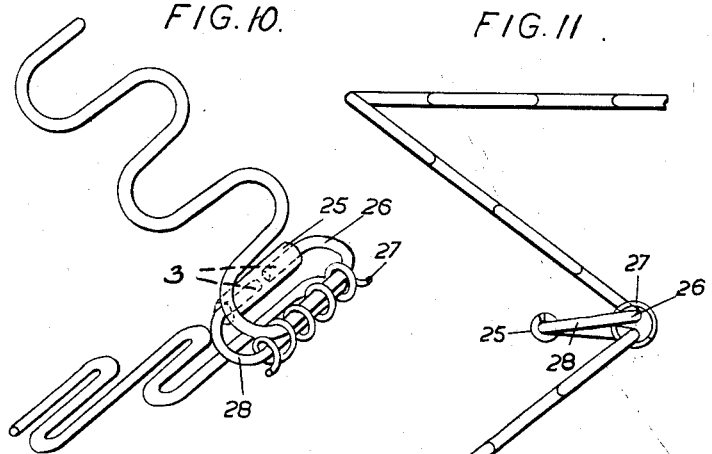
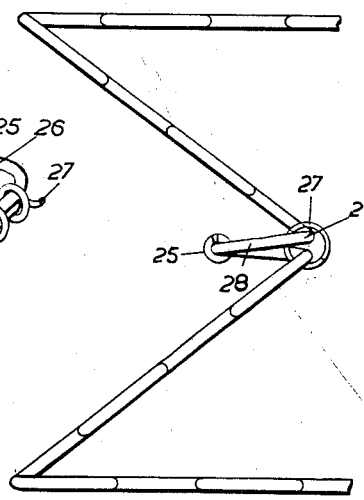
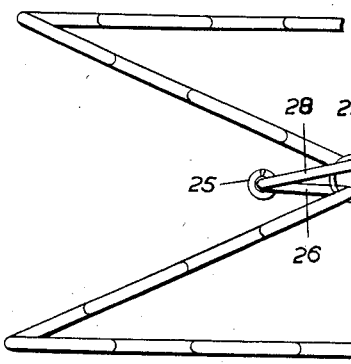
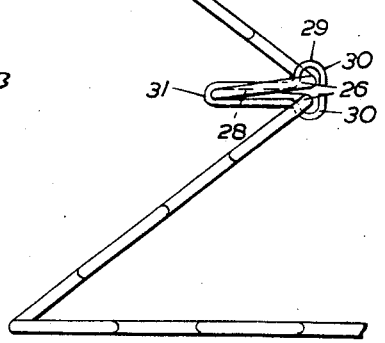
Inventor
ROBERT NEDDERMARK CARSON
By George B. White
Attorney United States Patent Office 2,818,104
Patented Dec. 31, 1957

2,818,104

SPRINGS AND SPRING ASSEMBLIES

Robert Neddermark Carson, Jr., Attenborough, England

Application November 19, 1951, Serial No. 256,981

13 Claims. (Cl. 155—179)

This invention concerns improvements relating to springs and spring assemblies particularly suitable for seats, mattresses and the like. The type of springs customarily employed for seats, mattresses and the like are coil springs and the disadvantage exists in the use of these springs that when a compressive force is applied by a person sitting on the seat, mattress or the like, the springs are not compressed in a direction precisely axially thereof and they cockle over. Disadvantages of this are that only part of the maximum possible resilient effect of the springs is obtained and the resilience that is obtained depreciates as the springs become further depressed; the springs of course may be made stronger, but then there is not the desired resilience at the commencement of pressure being applied. Another disadvantage is that the top or load supporting surface (by which is meant that surface to which pressure is normally applied in use) of the assembly tends to move longitudinally when the pressure is applied. Furthermore, it is usual to make seats with a crown top or load supporting surface and the disadvantage exists that this necessitates additional springs and base means for supporting them. These disadvantages have been overcome to some extent in spring assemblies which are built up from spring elements of "corrugated" form (by the word "corrugated," as used herein and where the contact so permits, is meant bent and/or curved into sinuous form with the bights and cross bars in a common plane). In one known construction, corrugated-wire spring units are constructed each from a length of corrugated wire bent about the axes of certain of the cross bars of the "corrugations" at spaced longitudinal locations in such manner as to form a pair of V shaped spring parts disposed with their apices directed towards each other, these parts being bridged by lengths of the corrugated wire extending from the outer ends of the arms of one V shaped part to those of the other V shaped part, one length at each side of said apices respectively. In an assembly, the units intersect each other, the bridging parts being disposed across the top or load supporting surface and bottom or opposite surface of the assembly and the V shaped parts being disposed at the sides of the assembly so that upon pressure being applied to the assembly in the usual manner, the pressure is transmitted to the V shaped parts of the units in a direction transversely thereof, i. e. in a direction at right angles to the axis of each V in the plane common to both arms, so that the arms have a closing movement imparted to them. Whilst this construction has advantages over coil springs, because centre springs and base means therefor are unnecessary and there is a saving of metal, one disadvantage is that, upon pressure being applied, the springs set; in other words, to provide a spring assembly which is intended to be a pre-determined depth in use, it is necessary to construct the assembly considerably deeper because when pressure is applied it becomes set at a less depth and this is due to the fact that the units are each formed by the bending of a single length of the corrugated wire into the described shape so that the applied pressure results in further bending of the apices of the V shaped parts.

The object of the invention is to overcome the above disadvantages.

The invention provides in or for a spring assembly or unit a spring consisting of a V shaped part of "corrugated" wire whereof the arms of the V are initially separate and are hingedly connected at the apex, and biasing means for biasing the arms of said part in an opening direction at least when incorporated in a spring assembly or unit. It will be understood that by virtue of the arms of the V being hinged at the apex the V parts or springs will not set at a reduced depth after pressure is applied and by virtue of the arms being biased in an opening direction, they will always return substantially to the same depth as they were originally, so that they need not be constructed of greater depth than is actually required when in use, thereby saving metal.

V parts or springs as described may be disposed in a spring assembly in any formation, but preferably they are disposed in pairs with the apices directed towards each other and with the outer ends of at least the uppermost arms bridged by a length of "corrugated" wire in continuation of the wire of said arms. In this spring assembly, there is little or no tendency for the top to move longitudinally when the pressure is applied.

Any suitable means may be provided for forming the hinge connection between the arms of each V part or spring such for example as coiled wire or metal tubing.

The invention also provides in or for a spring assembly, a spring unit made of "corrugated" wire and composed of two V shaped parts of the "corrugated" wire disposed with their apices directed towards each other, the outer ends of the arms at one side of the apices being connected by a length of the "corrugated" wire in continuation of the wire of said arms, the other arms being either similarly connected or having their outer ends bent towards each other, and the arms of each V being initially separate from each other and hingedly connected at the apex.

The invention further provides a spring assembly, comprising a load-supporting surface and spring elements for supporting it, each of which elements is a V-shaped structure of strip or wire corrugated along its length, having its arms hinged together at the apex and having the end of one arm connected to the said surface, combined with resilient means opposing closure of said V-shaped structure under load applied to said surface.

The above and other features of the invention are disclosed in the detailed description given by way of example of the particular embodiment illustrated in the drawings accompanying the provisional specification in which:

Figure 1 is a perspective view of a V spring according to this invention.

Figure 2 is an exploded view of the parts shown in Figure 1.

Figure 3 illustrates a modification.

Figure 4 illustrates a second modification.

Figure 5 is a detail of a third modification.

Figure 6 is a somewhat diagrammatical perspective view of a spring assembly according to the invention.

Figure 7 is a view of part of Figure 6.

Figure 10 is a detail perspective view showing a modified spring connection.

Figure 11 is a side view of a spring unit incorporating said connection.

Figure 12 is a similar view of Figure 11 with the unit compressed.

Figure 13 is a side view showing a further modified connection.

Referring now to Figure 1, a spring is provided consisting of two lengths of spring wire which are bent or curved in corrugated manner and are disposed to form spring arms 1 and 2 in V formation. The arms 1 and 2 are connected together at the apex by first bending the apex end of each arm inwardly of the V, then intertwining the extremities of the arms as shown at 3, and finally connecting the two arms together at the bends of the arms by a coil of wire 4. The parts are shown separately in Figure 2. The intertwined extremities at 3 form the biasing elements of the biasing means to bias said arms in an opening direction. Figure 3 shows a modification in which the ends of the arms are bent outwardly of the V instead of inwardly. Figure 4 shows a further modification wherein the arms are not bent either inwardly or outwardly but the extremities of the arms are connected by wire coil 4. Figure 5 illustrates that the wire coil 4 may be substituted by a metal tube 5.

Figure 9:
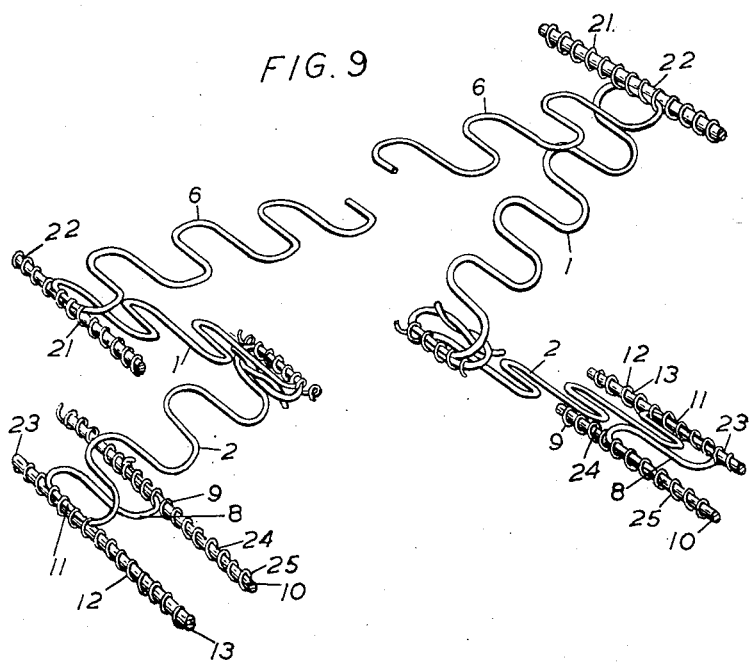
Figure 9 is a detailed view of part of the assembly shown in Figure 8.

In a modification of this unit, illustrated in Figure 9, the outer ends of the arms 2 of the V springs are bent towards each other to form inwardly projecting parts 8; the extremities of the parts 8 are connected conveniently by coiled wire 9 to rods or locating stays 10 respectively and the bends of the arms 11 are connected conveniently by coiled wire 12 to other bars or locating stays 13 respectively.

It is to be understood that a V spring as described and illustrated in any of Figures 1 to 4 or 5 may be incorporated in a spring assembly in any desired manner and that in Figures 1, 3 and 5 the manner of connecting the arms at the apex is such that after pressure has been applied to the arms transversely thereof and taken off the arms will spring back in an opening direction.

In the construction shown in Figure 4, however, the arms will not spring back to their initial disposition after pressure has been applied and other means must be provided in a spring assembly for said purpose. Such means may consist of resilient means for connecting pairs of the springs together to form a unit as described and illustrated for example with reference to Figure 9 at its lower part; it will be understood, however, that when springs according to Figures 1, 3 and 5 are employed, additional resilient means such as the aforesaid connecting means 6, in a unit may also be employed. Furthermore, if the connecting means consists of corrugated wire formed integrally with the arms of the V springs as shown in said Figure 9, the connecting wire 6 constitutes a flat load supporting surface for receiving applied pressures, and the resilient nature of the springs is enhanced by resilient resistance to further bending between the arms of the V springs and the connecting wire 6, and also between said arms and a similar lower connecting member or between the arms and the inwardly directed parts 8 (Figure 9).

It will be appreciated that V springs, or units, as described, may be arranged to form a spring assembly in any convenient manner, and Figure 6 shows one arrangement by way of example. In this example there are four outer spring units, constituting boundary units 14. There is also provided one or more intermediate similar units 15 disposed lengthwise and cross wise of the assembly so as to intersect each other. In addition there may be a pair of similar smaller units 16 disposed diagonally of the assembly and intersecting each other substantially at the centre of the assembly. Conveniently the units are connected together in the desired formation by coils of wire 17 as illustrated for example in Figure 7. Figure 6 also illustrates that those apices of the V springs which are in alignment may be connected by a common length of coiled wire 18 forming their hinges.

Figure 8:
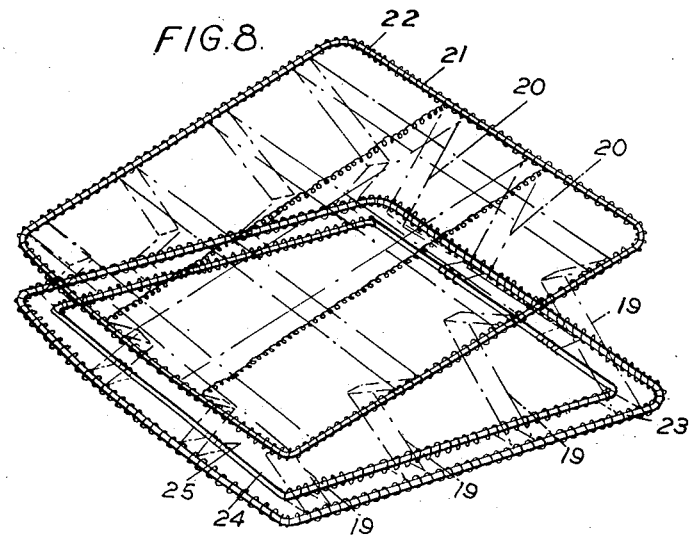
Figure 8 is a somewhat diagrammatical view of a modified spring assembly.

A further example of an assembly according to this invention is illustrated in Figure 8. In this example there is provided a plurality of spring units of the construction shown in Figure 9. More specifically there are four of such units 19 each of a different depth so that the assembly is deeper at one end (say the front) than at the other (or rear) end, as shown. There is also provided one or more similar units 20 disposed transversely of the first mentioned units and intersecting them; these latter units 20 taper from front to rear. All the units are connected in the desired disposition in the assembly by coiled wire 21, and desirably this coiled wire also connects the units to frames 22 and 23. There is also provided an inner frame 24 to which the extremities of the bent over parts 8 of arms of the V springs may be connected by coiled wire 25.

In either of the assemblies, illustrated in Figures 6 and 8, it will be appreciated that when pressure is applied to the top or load supporting surface a closing movement is imparted to the arms of the V springs, and because of the hinge connections at the apices they will not set at a less depth, but will return substantially to their original depth under the influence of the resilient means provided. Furthermore, because of such hinged connections the upper part or load supporting surface of the assemblies will move towards the opposite part thereof in a direction with substantially little or no movement of the upper part or load supporting surface longitudinally.

It is to be understood that springs, spring units or spring assemblies according to the invention may be employed for any suitable purpose and in any suitable structure such for example as seats of any kind, including motor vehicle seats, and back rests and the like.

It is to be understood that although coiled wire has been mentioned for connecting various parts of the corrugated wire to other parts thereof and to parts of framework, any other suitable connecting means may be employed if desired, such for example as clips.

It is also to be understood that certain of the initially separate parts of corrugated wire may be made from wire of a different metal and/or gauge from other parts to obtain desired resilience; furthermore certain of the V shaped corrugated parts may be longer than others to obtain desired resiliency.

In the modified arrangement according to the invention and illustrated in Figures 10 to 12 the end cross bars 3 of the arms of the corrugated springs are of half length and in line with each other, and these cross bars are connected together by them extending end to end through a tube 25 or other means such as coiled wire for example. Those cross bars 26 at the bends of the arms are connected by coiled wire, tubing clips or the like 27 as desired. The arrangement is preferably such that the coiled wire, tubing, clips or the like 27 connecting the cross bars 26 at the bends of the arms together are of somewhat greater cross sectional diameter than the joint diameters of said cross bar 26 (as shown in Figure 11) in such manner as to allow divergent movement of the bent ends 28 of the arms about the axis of the end cross bars 3 when the spring is compressed as shown in Figure 12.

If desired a connecting member such for example as that shown at 29 in Figure 13 may be provided common to the crossbars 3 and 26, said member consisting for example of a plate clip 31 and conveniently of enlarged cross sectional dimensions at 30 to allow for said divergent movements of the bent ends 28 of the springs.

It is also to be understood that a self contained spring assembly unit may be formed incorporating said springs or spring units in any desired manner and having a framework to which the springs are attached and this framework may be readily fixed for example to the base or back of a seat for example by staples. One construction of such a spring assembly unit is shown in Figure 8 and this is to be considered as an example of a spring assembly unit which is of any convenient shape and construction and according to an important feature of the invention has not only said outer frame 23 but also said inner frame 25 which extends substantially parallel to the outer frame 23, the frames together forming a frame-like base which may be readily stapled or otherwise fixed to a seat, frame, backrest frame or the like.

I claim:

1. In a spring assembly unit, a spring comprising a substantially V-shaped connecting structure of corrugated wire, the upper and lower parts of said structure being initially separate at the intermediate apex of said structure, and overlapping biasing elements for joining the arms of said V-shaped structure and biasing them in an opening direction near said apex.

2. In a spring assembly unit according to claim 1, wherein adjacent cross bars of the corrugations of said parts spaced from said biasing elements are connected at said apex by a separate anchoring member in which extensions of said adjacent cross bars of said arms are lodged.

3. In a spring assembly unit according to claim 1, wherein the lower ends of said lower part are connected to a base frame, and wherein a second base frame is disposed substantially parallel to said first base frame, said lower ends being connected also to said second base frame so as to form a base structure of band form defining a void in the center.

4. In a spring assembly unit according to claim 1, wherein the wire of the lower part has different properties of resilience than the wire from which the upper unit is composed so as to vary the load bearing characteristics when the lower part is brought into action.

5. In a spring assembly unit according to claim 1, wherein said overlapping biasing elements are formed by joining of adjacent end portions of said arms, said joint being offset to one side of said apex, said arms being connected at said apex and at said joint in a substantially common plane intersecting said apex.

6. In a spring assembly unit according to claim 5, wherein adjacent cross-bars of said parts spaced from said biasing elements are interconnected at said apex by bars extending through an anchoring member.

7. In a spring assembly unit according to claim 5, wherein adjacent crossbars of said parts spaced from said biasing elements are interconnected at said apex by a separate connecting member, and wherein said end portions of said parts at said biasing joint are connected by one of said end portions intertwining around the other.

8. In a spring assembly unit according to claim 5, wherein adjacent crossbars of said parts spaced from said biasing elements are interconnected at said apex, said connection being such as to allow arcuate movement of said bars at said apex away from each other and about the axis of said joined end portions.

9. In a spring assembly unit according to claim 8, wherein said connection is formed by a connecting member through which said crossbars at said apex extend, said member being of greater inner cross section than the combined cross sectional dimension of said crossbars at said apex.

10. In a spring assembly unit according to claim 5, wherein a common connecting member extends over both the connection at the end portions of said parts and at the apex thereof.

11. In a spring assembly unit according to claim 5, wherein free end portions at the lower parts of opposite structures are bent towards each other, and wherein means are provided to anchor said bent free end portions.

12. In a spring assembly unit according to claim 11, said anchoring means comprising locating stays.

13. A spring assembly comprising in combination a load-supporting member, spring elements for supporting it, each of said elements being a V-shaped structure having its upper and lower parts connected together at the intermediate apex and having the upper part connected to said load-supporting member and resilient means associated with said elements and connecting said V-shaped structure to a support so as to oppose closure of said V-shaped structure under load applied to said load-supporting member.

References Cited in the file of this patent

UNITED STATES PATENTS

| | | |
|---|---|---|
| 134,430 | Hawk | Dec. 31, 1872 |
| 1,815,210 | O'Brien | July 21, 1931 |
| 2,122,979 | Gleason | July 5, 1938 |
| 2,201,997 | Freund | May 28, 1940 |
| 2,257,633 | Bank | Sept. 30, 1941 |
| 2,560,842 | Blumensaadt et al. | July 17, 1951 |

FOREIGN PATENTS

| | | |
|---|---|---|
| 754,074 | France | Oct. 31, 1933 |